United States Patent
Bohling et al.

(10) Patent No.: US 10,435,582 B2
(45) Date of Patent: Oct. 8, 2019

(54) AQUEOUS DISPERSION OF ADSORBING POLYMER PARTICLES AND CROSSLINKABLE POLYMER PARTICLES

(71) Applicant: Rohm and Haas Company, Collegeville, PA (US)

(72) Inventors: James C. Bohling, Lansdale, PA (US); Carol Hawkins, Lansdale, PA (US); Anna Kvecher, Chalfont, PA (US); Pu Luo, King Of Prussia, PA (US); Partha S. Majumdar, Harleysville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 103 days.

(21) Appl. No.: 15/718,036

(22) Filed: Sep. 28, 2017

(65) Prior Publication Data

US 2018/0094160 A1   Apr. 5, 2018

Related U.S. Application Data

(60) Provisional application No. 62/404,529, filed on Oct. 5, 2016.

(51) Int. Cl.
| | |
|---|---|
| *C09D 133/14* | (2006.01) |
| *C09D 133/24* | (2006.01) |
| *C08F 220/18* | (2006.01) |
| *C08F 220/14* | (2006.01) |
| *C09D 7/61* | (2018.01) |
| *C08F 265/06* | (2006.01) |
| *C09D 151/00* | (2006.01) |
| *C08K 5/25* | (2006.01) |
| *C08K 3/22* | (2006.01) |

(52) U.S. Cl.
CPC .......... *C09D 133/14* (2013.01); *C08F 220/14* (2013.01); *C08F 220/18* (2013.01); *C08F 265/06* (2013.01); *C08K 5/25* (2013.01); *C09D 7/61* (2018.01); *C09D 133/24* (2013.01); *C09D 151/003* (2013.01); *C08F 2220/1825* (2013.01); *C08K 3/22* (2013.01); *C08K 2003/2241* (2013.01)

(58) Field of Classification Search
CPC .......................... C09D 133/24; C09D 133/14
See application file for complete search history.

(56) References Cited

U.S. PATENT DOCUMENTS

| | | | |
|---|---|---|---|
| 5,710,227 A | 1/1998 | Freeman et al. | |
| 7,265,166 B2 | 9/2007 | Gebhard et al. | |
| 7,285,590 B2 | 10/2007 | Holub et al. | |
| 8,575,259 B2 | 11/2013 | Tomizaki et al. | |
| 9,040,617 B2 | 5/2015 | Yang et al. | |
| 2005/0009954 A1* | 1/2005 | Gebhard | C08F 220/18 523/210 |
| 2005/0107527 A1 | 5/2005 | Holub et al. | |
| 2015/0005446 A1* | 1/2015 | Bohling | C08F 2/001 524/807 |
| 2015/0011695 A1 | 1/2015 | Bohling et al. | |
| 2015/0361301 A1 | 12/2015 | Egan et al. | |
| 2016/0145430 A1 | 5/2016 | Junk et al. | |

FOREIGN PATENT DOCUMENTS

| | | |
|---|---|---|
| JP | 2006008833 A | 1/2006 |
| JP | 2007176961 A | 7/2007 |

\* cited by examiner

*Primary Examiner* — Arrie L Reuther
(74) *Attorney, Agent, or Firm* — Reid S. Willis

(57) ABSTRACT

The present invention relates to composition comprising a) first polymer particles that are functionalized with structural units of a TiO$_2$-adsorbing monomer, and second polymer particles that are functionalized with structural units of diacetone acrylamide; and b) a dihydrazide or a diamine crosslinking agent, based on the weight of the composition. Coatings prepared from the composition of the present invention shows improved hardness and gloss.

11 Claims, No Drawings

AQUEOUS DISPERSION OF ADSORBING POLYMER PARTICLES AND CROSSLINKABLE POLYMER PARTICLES

BACKGROUND OF THE INVENTION

The present invention relates to a composition comprising an aqueous dispersion of polymer particles functionalized with adsorbing groups and polymer particles functionalized with crosslinkable groups. The composition of the present invention is useful in coating compositions.

An ongoing challenge in the field of architectural coatings is the development of a low volatile organic content (low VOC) aqueous dispersion of polymer particles (i.e., a latex) that provides a tack free hard surface in gloss or accent formulations for exterior applications; state of the art low VOC formulations exhibit gloss loss and grain cracking in accelerated weathering tests. Therefore, it would be an advantage in the art of architectural coatings to find a low VOC latex that delivers improved hardness and gloss.

SUMMARY OF THE INVENTION

The present invention addresses a need in the art by providing a composition comprising
a) an aqueous dispersion of 1) first polymer particles functionalized with from 0.1 to 5 weight percent structural units of a $TiO_2$-adsorbing monomer, based on the weight of the first polymer particles; and 2) second polymer particles functionalized with from 0.1 to 12 weight percent structural units of diacetone acrylamide, based on the weight of the second polymer particles; wherein the first and second polymer particles have an average particle size in the range of from 75 nm to 350 nm; and
b) from 0.1 to 10 weight percent of a dihydrazide or a diamine crosslinking agent, based on the weight of the composition.

The composition of the present invention delivers improved hardness and gloss retention in accelerated weather tests over latexes that are not functionalized as specified.

DETAILED DESCRIPTION OF THE INVENTION

The present invention is a composition comprising a) an aqueous dispersion of 1) first polymer particles functionalized with from 0.1 to 5 weight percent structural units of $TiO_2$-adsorbing monomer, based on the weight of the first polymer particles; and 2) second polymer particles functionalized with from 0.1 to 12 weight percent structural units of diacetone acrylamide, based on the weight of the second polymer particles; wherein the first and second polymer particles have an average particle size in the range of from 75 nm to 350 nm; and
b) from 0.1 to 10 weight percent of a dihydrazide or a diamine crosslinking agent, based on the weight of the composition.

The first and second polymer particles are preferably acrylic or styrene-acrylic polymer particles having an average particle size preferably in the range of from 80 nm to 250 nm. As used herein, average particle size for the polymer particles refers to the particle size measured using a Brookhaven BI90 particle analyzer. The weight:weight ratio of first polymer particles to the second polymer particles is in the range of from 30:70, preferably from 40:60, to 90:10, preferably to 60:40.

The first polymer particles preferably have a glass transition temperature ($T_g$), as calculated by the Fox equation (see T. G. Fox, *Bull. Am. Phys. Soc.* 1, 123 (1956)), in the range of from −5° C., more preferably from 0° C., to 40° C., more preferably to 25° C. The second polymer particles are preferably film-forming at ambient temperature; accordingly, the second polymer particles preferably have a $T_g$, of not greater than 25° C., more preferably not greater than 15° C., and most preferably not greater than 5° C.

Preferably, the first and second polymer particles comprise structural units of methyl methacrylate ($T_g$=105° C.) or styrene ($T_g$=100° C.), and at least one monomer selected from the group consisting of ethyl acrylate ($T_g$=−22° C.), butyl acrylate ($T_g$=−54° C.), 2-ethylhexyl acrylate ($T_g$=−85° C.), and 2-propylheptyl acrylate ($T_g$=−68° C.). The first and second polymer particles each preferably comprise from 0.2, more preferably from 0.5, and most preferably from 1 weight percent, to preferably 5, and more preferably to 3 weight percent structural units of a carboxylic acid monomer such as acrylic acid ($T_g$=103° C.), methacrylic acid ($T_g$=185° C.), or itaconic acid ($T_g$=154° C.).

Preferred combinations of acrylic monomers include methyl methacrylate and one or more monomers selected from the group consisting of ethyl acrylate, butyl acrylate, ureido methacrylate, 2-propylheptyl acrylate, and 2-ethylhexyl acrylate. More preferred combinations of acrylic monomers include methyl methacrylate and butyl acrylate; methyl methacrylate and 2-ethylhexyl acrylate; and methyl methacrylate, butyl acrylate, and ethyl acrylate, with the combination of methyl methacrylate and 2-ethylhexyl acrylate being most preferred.

The term "structural unit" of the named monomer refers to the remnant of the monomer after polymerization. For example, a structural unit of diacetone acrylamide (DAAM) is as illustrated:

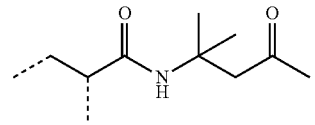

where the dotted lines represent the points of attachment of the structural unit to the polymer backbone.

The polymer particles may be prepared by way of a single stage or by a multistage polymerization reaction, preferably multistage. The morphology of the first and second polymer particles is not critical. For example, the first polymer particles may have a spherical morphology or an acorn morphology, whereby a core portion protuberates from a shell portion of the polymer particles. Where the first polymer particles have an acorn morphology, it is often advantageous for the protuberating core portion to be preferentially functionalized with structural units of the phosphorus acid monomer.

As used herein, the term "$TiO_2$ adsorbing monomer" refers to a phosphorus acid monomer; itaconic acid; or a terminally unsaturated oligomer represented by the following structure:

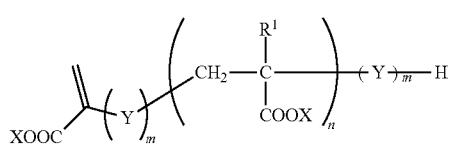

where each m is independently 0 to 75; and n is from 3 to 150; with the proviso that m+n is 3 to 150; COOX is a carboxylic acid group or a salt thereof; each Y is independently a structural unit of an ethylenically unsaturated monomer other than acrylic acid or methacrylic acid or salts thereof; and $R^1$ is H or $CH_3$. Examples of ethylenically unsaturated monomers other than acrylic acid or methacrylic acid include methyl methacrylate, ethyl acrylate, butyl acrylate, butyl methacrylate, 2-ethylhexyl acrylate, hydroxyethyl methacrylate, maleic acid, itaconic acid, styrene sulfonic acid, acrylamide, 2-acrylamido-2-methylpropanesulfonic acid, phosphoethyl methacrylate, and styrene. The terminally unsaturated ethylenically unsaturated monomer can be prepared as described U.S. Pat. No. 5,710,227.

A preferred $TiO_2$ adsorbing monomer is a phosphorus acid monomer. The first polymer particles preferably comprise from 0.2, more preferably from 0.3, to 3 weight percent structural units of a phosphorus acid monomer, and preferably comprise less than 0.1, more preferably less than 0.01, more preferably less than 0.001 weight percent, and most preferably 0 weight percent structural units of DAAM. Examples of suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkyl acrylates or methacrylates, including phosphoethyl methacrylate (PEM) and phosphopropyl methacrylates. PEM, which is an especially preferred phosphorus acid monomer, is represented by the following structure:

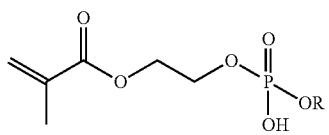

where R is H or

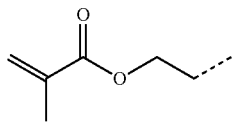

The first polymer particles preferably comprises from 0.3 to 10 weight percent, based on the weight of the first polymer particles, of structural units of a multiethylenically unsaturated monomer such as allyl methacrylate or divinyl benzene. The first polymer particles also preferably comprise less than 0.05, more preferably less than 0.01, and most preferably 0 weight percent structural units of diacetone acrylamide, based on the weight of the first polymer particles.

The second polymer particles, which are preferably nonadsorbing, preferably comprise from 1 to 5 weight percent structural units of DAAM, and preferably comprise less than 0.09, more preferably less than 0.01, more preferably less than 0.001 weight percent, and most preferably 0 weight percent structural units of the $TiO_2$-adsorbing monomer, preferably of a phosphorus acid monomer, based on the weight of the second polymer particles. The second polymer particles are preferably 2-phase polymer particles preferably having an overall $T_g$ of less than 5° C. The second polymer particles preferably have a first phase $T_g$ of less than 10° C., more preferably less than 0° C., and most preferably less than −10° C.; and a second phase $T_g$ of preferably greater than 40° C., more preferably greater than 60° C., and most preferably greater than 80° C.

In one preferred embodiment, the first phase of the second polymer particles comprises from 45, more preferably from 48, most preferably from 50, to preferably 70, more preferably to 65, and most preferably to 60 weight percent structural units of 2-ethylhexyl acrylate, based on the weight of the first phase of the polymer particles; and preferably from 20, more preferably from 30, and most preferably from 35, to preferably 50, more preferably to 45 weight percent structural units of methyl methacrylate or styrene, preferably methyl methacrylate based on the weight of the first phase of the second polymer particles.

In another preferred embodiment, the first phase comprises from 1, more preferably from 7, and most preferably from 10, to 80, more preferably to 60 and most preferably to 40 weight percent butyl acrylate, based on the weight of the second polymer particles; and from 0, more preferably from 15, more preferably from 25, and most preferably from 40, to 70, more preferably to 65, and most preferably to 60 weight percent 2-ethylhexyl acrylate, based on the weight of the first phase of the second polymer particles; and from 10, more preferably from 20, more preferably from 30, and most preferably from 35, to preferably 50, more preferably to 45 weight percent structural units of methyl methacrylate or styrene, preferably methyl methacrylate based on the weight of the first phase of the second polymer particles.

The first phase of the second polymer particles preferably comprises from 1 to 5 weight percent structural units of DAAM, based on the weight of the first stage of the second polymer particles; moreover, the first phase of the second polymer particles preferably comprises from 0.5 to 5 weight percent structural units of acrylic acid or methacrylic acid.

The second phase of the second polymer particles preferably comprises from 80, more preferably from 85, and most preferably from 90 weight percent, to 98.5, more preferably to 98, and most preferably to 97 weight percent structural units of methyl methacrylate or styrene, preferably methyl methacrylate. The second phase of the second polymer particles preferably comprises preferably from 1 to 5 percent structural units of DAAM, based on the weight of the second phase of the second polymer particles; the second phase of the second polymer particles preferably comprises from 0.5 to 5 weight percent structural units of acrylic acid or methacrylic acid.

The ratio of the first phase to second phase of the second polymer particles is preferably in the range of from 85:15, more preferably from 80:20, and most preferably from 75:25, to preferably 65:35.

It is further preferred that neither the first or second polymer particles contain an appreciable amount of structural units of acetoacetoxyethyl methacrylate (AAEM); more particularly, the particles preferably comprise less than 0.1, more preferably less than 0.05, and most preferably less than 0.01 weight percent structural units of AAEM because AAEM has been found to generate undesirable color.

The composition of the present invention is preferably a low VOC composition with a VOC concentration of less than 50 g/L. In another aspect, the composition further comprises one or more materials selected from the group consisting of pigments such as $TiO_2$, fillers, defoamers, surfactants, dispersants, thickeners, coalesecents, colorants, preservatives, flow agents, leveling agents, and neutralizers.

Coatings prepared from the composition of the present invention have been observed to show improved hardness and gloss retention over coatings known in the art.

EXAMPLES

Intermediate Example 1—Preparation of PEM-Functionalized Binder

A first monomer emulsion (ME1) was prepared by mixing DI water (148.4 g), Disponil FES-32 surfactant (38.2 g), followed by butyl acrylate (BA, 322.6 g), methacrylic acid (MAA, 2.9 g), benzophenone (4.2 g), allyl methacrylate (ALMA, 3.9 g), and methyl methacrylate (MMA, 387.4 g).

A second monomer emulsion (ME1) was prepared by mixing DI water (308.5 g), Disponil FES-32 surfactant (39.4 g), followed by BA (515 g), PEM (39.3 g, 60% active), MAA (10.7 g), and MMA (500 g).

A 4-L reactor equipped with a mechanical stirrer, nitrogen gas blanket, thermometer, condenser, heating mantel and temperature controller was charged with deionized water (1147.5 g) and heated to 86° C. while purged with $N_2$. To this reactor were added Disponil FES-32 surfactant (2.35 g) in water (6 g), a portion of monomer emulsion 1 (111.4 g) in water (5 g), and a solution of sodium persulfate (5.4 g) in water (40.4 g).

Eight minutes after addition, a co-feed catalyst solution of sodium persulfate (1.6 g) in water (89.4 g) and ME1 were fed in the reactor at rates of 0.8 g/min and 17.7 g/min, respectively, and the reaction temperature was controlled at 85° C. After the ME 1 feed was complete, the monomer emulsion vessel was rinsed with DI water (20 g), addition of the co-feed catalyst solution was stopped, and the reactor temperature was controlled at 85° C.

Fifteen minutes later, the co-feed catalyst solution feed was resumed at a rate of 1.0 g/min, followed the addition of ME2 at the rate of 20.2 g/min, and the reaction temperature was controlled at 85° C. After the ME2 addition was complete, the monomer emulsion vessel was rinsed with DI water (20 g), and the reactor is cooled to 75° C.

When the reactor was cooled to 75° C., a solution of ammonium hydroxide (30.2 g, 28% aqueous solution) in water (6 g) was added to the reactor at a rate of 3.02 g/min, and the reactor was cooled to 70° C.

When the reactor was cooled to 70° C., a solution of ferrous sulfate heptahydrate (4 g, 0.15% aqueous solution), VERSENE™ EDTA (A Trademark of The Dow Chemical Company, 0.9 g, 1% aqueous solution), and copper nitrate (0.02 g, 42% aqueous solution) was added to the reactor, followed by the addition of a solution of t-butyl hydroperoxide (t-BHP, 0.8 g, 70% aqueous solution) in water (20.5 g). The reactor was cooled and a solution and a solution of isoascorbic acid (0.6 g) in water (24.1 g) were slowly added to the reactor to reduce the residual monomer. After completion of all feeds, a solution of ammonium hydroxide (5.3 g, 28% aqueous solution) was added to the reactor at a rate of 0.35 g/min. After the ammonium hydroxide addition was complete, a solution of KORDEK™ LX5000 Biocide (1.6 g, 50% aqueous solution), Tego Foamex Defoamer 1488 (2.9 g), and water (25 g) were added to the reactor. After the reactor was cooled to room temperature, the contents were filtered to remove gel. The filtered dispersion was found to have a solids content of 46% and a pH of 7.9.

Comparative Intermediate Example 1—Preparation of DAAM- and PEM-Functionalized Binder ME1 was prepared by mixing DI water (331.6 g), Disponil FES-32 surfactant (28.3 g), followed by DAAM (21.2 g), 2-ethylhexyl acrylate (EHA, 639.8 g), MMA (376.4 g), MAA (16.1 g), and PEM (21.5 g, 60% active).

ME2 was prepared by mixing DI water (130.0 g), Disponil FES-32 surfactant (22.0 g), DAAM (8.8 g), MMA (417.3 g), and MAA (13.2 g).

A 4-L reactor equipped with a mechanical stirrer, nitrogen gas blanket, thermometer, condenser, heating mantel and temperature controller was charged with deionized water (834 g) and heated to 85° C. while purged with $N_2$. To this reactor were added Disponil FES-32 surfactant (34.1 g) in water (20 g), 53 g of ME1 in water (20 g), and a solution of ammonium persulfate (4.1 g) in water (40 g).

Five minutes after addition, a co-feed catalyst solution of ammonium persulfate (1.4 g) in water (106 g) and ME1 was fed in the reactor at rates of 1.0 and 10.4 g/min, respectively, and the reaction temperature was controlled at 85° C. Twenty minutes later, the ME1 feed rate was increased to 20.8 g/min and the reaction temperature was controlled at 85° C. After the ME1 feed was complete, the monomer emulsion vessel was rinsed with DI water (50 g), the co-feed catalyst solution was stopped, and then a solution of sodium carbonate (3.0 g) in water (50 g) and ammonium hydroxide (7 g, 28% aqueous solution) was added to the reactor. The reactor temperature was controlled at 85° C.

Ten minutes later, the co-feed catalyst solution feed was resumed at a rate of 1.0 g/min, followed the addition of ME2 at the rate of 20.8 g/min, and the reaction temperature was controlled at 85° C. After the ME2 addition was complete, the monomer emulsion vessel was rinsed with DI water (30 g), and the reactor cooled to 80° C.

A solution of ferrous sulfate heptahydrate (20 g, 0.15% aqueous solution) was then added to the reactor, followed by addition of a solution of t-BHP (1.2 g, 70% aqueous solution) in water (18.5 g) and a solution of Bruggolite FF6M reducing agent (0.8 g) in water (19.1 g) to reduce the residual monomer. After completion of all feeds, the reactor was cooled to room temperature. When the reactor temperature reached 50° C., ammonium hydroxide (8 g, 28% aqueous solution), followed by a slurry of adipic acid dihydrazide (15.0 g) in water (70 g) was added to the reactor. When the reactor temperature reached to 40° C., a solution of KATHON™ LX bactericide (A Trademark of The Dow Chemical Company or its Affiliates, 11.63 g, 1.5% aqueous solution) in water (20 g), a solution of KORDEK™ LX5000 (A Trademark of The Dow Chemical Company or its Affiliates, 1.7 g, 50% aqueous solution) in water (20 g), and Rhodoline 643 defoamer (1.7 g) were added to the reactor. After vessel was cooled to room temperature, the contents were filtered to remove gel. The filtered dispersion was found to have a solids content of 45.4% and a pH of 8.

Intermediate Example 2—Preparation of DAAM-Functionalized Binder

ME1 was prepared by mixing DI water (331.6 g), Disponil FES-32 surfactant (50 g), followed by DAAM (20.9 g), 2-EHA (640.5 g), MMA (376.4 g), and MAA (37.6 g).

ME2 was prepared by mixing DI water (130.0 g), Disponil FES-32 surfactant (22.0 g), DAAM (8.5 g), MMA (417.5 g), and MAA (13.2 g).

A 4-L reactor equipped with a mechanical stirrer, nitrogen gas blanket, thermometer, condenser, heating mantel and temperature controller was charged with deionized water (824 g) and heated to 85° C. while purged with $N_2$. To this reactor were added Disponil FES-32 surfactant (12.3 g) in water (20 g), a solution of sodium carbonate (3.04 g) in water (60 g), a portion of ME1 (53 g) in water (22.5 g), and a solution of ammonium persulfate (4.0 g) in water (40 g).

Five minutes later, a co-feed catalyst solution of ammonium persulfate (1.4 g) in water (106 g) was fed in the reactor at a rate of 0.95 g/min, followed by the addition of ME1 at the rate of 10.4 g/min, and the reaction temperature was controlled at 85° C. Twenty minutes later, the ME1 feed rate was increased to 20.8 g/min and the reaction temperature was controlled at 85° C. After the ME1 feed was complete, the monomer emulsion vessel was rinsed with DI water (50 g), the co-feed catalyst solution was stopped, and the reaction temperature was controlled at 85° C.

Thirty minutes later, the co-feed catalyst solution feed was resumed at a rate of 1.0 g/min, followed the addition of ME2 at the rate of 22.5 g/min, and the reaction temperature was controlled at 85° C. After the ME2 addition was complete, the monomer emulsion vessel was rinsed with DI water (32 g), and the reactor was cooled to 60° C.

A solution of ferrous sulfate heptahydrate (20 g, 0.15% aqueous solution) was added to the reactor, followed by the addition of a solution of t-BHP (1.2 g, 70% aqueous solution) in water (18.5 g), and a solution of Bruggolite FF6M reducing agent (0.6 g) in water (19.1 g). After completion of addition of all feeds, the reactor was cooled. When the reactor reached 50° C., ammonium hydroxide (10 g, 28% aq.), was added followed by addition of a slurry of adipic acid dihydrazide (15.0 g) in water (70 g). When the reactor temperature reached 40° C., a solution of KATHON™ LX bactericide (11.6 g, 1.5%) in water (20 g), and solution of KORDEK™ LX5000 Biocide (1.7 g, 50% aqueous solution) in water (20 g) were added. After the reactor was cooled to room temperature, the contents were filtered to remove gel. The filtered dispersion was found to have a solids content of 45.5% and a pH of 8.

Paint Preparation

The composition is summarized in Table 1. The procedure for preparing the paints were as follows:

Pre-mix was prepared by adding binder to a 1-L plastic container (let down tank in Table 1) followed by defoamer addition under mild agitation. The remainder of the pre-mix ingredients were added one by one slowly into the vortex and mixed for about 10-15 min. $TiO_2$ slurry was added slowly into the pre-mix with moderate mixing. The paint was finished by an addition of coalescent, rheology modifiers, and final defoamer addition.

In Table 1, binder refers to the paint formulation prepared using a combination of binders from Intermediate Examples 1 and 2; or a paint formulation prepared using the binder of Comparative Intermediate Example 1; or a paint formulation prepared using the binder of Intermediate Example 1 only. Byk-024 refers to Byk-024 defoamer; Tergitol 15-S-40 refers to TERGITOL™ 15-S-40 Ethoxylated Surfactant; Tamol 2011 refers to TAMOL™ 2011 Dispersant; Kathon LX 1.5% refers to KATHON™ LX; Ti-Pure R-746 refers to Ti-Pure R-746 $TiO_2$ slurry; RM 1660 and RM 995 refer to ACRYSOL™ RM 1600 and ACRYSOL™ 95 Rheology Modifiers respectively.

TERGITOL, TAMOL, KATHON, KORDEK, and ACRYSOL are all Trademarks of The Dow Chemical Company or its Affiliates.

Table 1 illustrates the components used to prepare the paint formulations of the example and comparative examples.

TABLE 1

Paint Formulation

| | Wt (g) |
|---|---|
| Letdown | |
| Binder | 584.3 |
| Byk-024 | 1.0 |
| Premix | |
| Propylene Glycol | 7.0 |
| Tergitol 15-S-40 | 2.0 |
| Water | 16.7 |
| Tamol 2011 | 3.1 |
| Kathon LX 1.5% | 1.5 |
| Premix Subtotal | 30.3 |
| Ti-Pure R-746 | 285.1 |
| Water | 83.4 |
| Texanol | 7.9 |
| RM-1600 | 35.0 |
| RM-995 | 3.5 |
| Byk-024 | 2.0 |
| Totals | 1032.4 |

Measurements of König Hardness

Drawdowns of paints were made over untreated aluminum panels using a square applicator at 25° C. and 50% RH. The wet film thickness was 5 mil. Coatings were dried for the 14 d at 25° C. and 50% RH before measuring König hardness using Byk Mallinckrodt König Pendulum Hardness Tester.

Accelerated Weathering

A paint film was applied over an aluminum panel with a 7-mil gap drawdown bar. The coating was dried for 7 d under 25° C. and 50% RH conditions. An initial 60° gloss reading was recorded; next, the coating was exposed in a UV condensation weathering machine for 500 h. The cycle consisted of 4 h of UV exposure at 60° C. and 4 h condensation exposure at 40° C. At the end of the exposure period, gloss of the coating was measured using a BYK micro-TRI-gloss µ-gloss meter.

The results of König Hardness and 60° gloss for 3 paint formulations were measured and shown in Table 2. Binder 1 refers to the binder prepared from Intermediate Example 1; Binder 2 refers to Binder prepared from Comparative Intermediate Example 1; and Binder 3 refers to a 52:48 weight-weight mixture of Intermediate Example 1 and Intermediate Example 2 binders. The paint prepared using Binder 1 is referred to as Comp. Ex. 1; the paint prepared from Binder 2 is referred to as Comp. Ex. 2; and the paint prepared from Binder 3 is referred to as Ex. 1. 60° $Gloss_o$ refers to the initial gloss; 60° $Gloss_f$ refers to the gloss after 500 h of QUV exposure; and Δ Gloss is 60° $Gloss_f$−60° $Gloss_o$.

| Paint Example | Binder | König Hardness (14 d) | 60° $Gloss_o$ | 60° $Gloss_f$ | Δ Gloss |
|---|---|---|---|---|---|
| Comp Ex. 1 | 1 | 21.0 s | 77.4 | 67.1 | −10.3 |
| Comp Ex. 2 | 2 | 23.8 s | 72.7 | 54.0 | −18.7 |
| Ex. 1 | 3 | 29.4 s | 74.9 | 68.7 | −6.2 |

The results show that the paint formulation containing two distinctly functionalized binders—one functionalized with PEM and the other functionalized with DAAM—shows superior König Hardness and gloss retention as compared with a paint containing binder only functionalized with PEM and a paint containing binder functionalized with both DAAM and PEM.

The invention claimed is:

1. A composition comprising
   a) an aqueous dispersion of 1) first polymer particles functionalized with from 0.1 to 5 weight percent structural units of a $TiO_2$-adsorbing monomer, based on the weight of the first polymer particles; and 2) second polymer particles functionalized with from 0.1 to 12 weight percent structural units of diacetone acrylamide, based on the weight of the second polymer particles; wherein the first and second polymer particles have an average particle size in the range of from 75 nm to 350 nm; and
   b) from 0.1 to 10 weight percent of a dihydrazide or a diamine crosslinking agent, based on the weight of the composition;
   wherein the $TiO_2$-adsorbing monomer is a phosphorus acid monomer, and wherein the second polymer particles comprise less than 0.09 structural units of the phosphorus acid monomer based on the weight of the second polymer particles.

2. The composition of claim 1 wherein the second polymer particles are two-phase polymer particles having a first phase with a $T_g$ of less than 10° C. and a second phase with a $T_g$ of greater than 40° C.

3. The composition of claim 2 wherein the first polymer particles comprise from 0.3 to 10 weight percent, based on the weight of the first polymer particles, of structural units of a multiethylenically unsaturated monomer.

4. The composition of claim 3 wherein the first polymer particles comprise less than 0.05 weight percent structural units of diacetone acrylamide, based on the weight of the first polymer particles; and wherein the second polymer particles comprise less than 0.05 weight percent structural units of the phosphorus acid monomer, based on the weight of the second polymer particles, wherein the phosphorus acid monomer is phosphoethyl methacrylate.

5. The composition of claim 4, wherein the first polymer particles are functionalized with from 0.3 to 3 weight percent structural units of phosphoethyl methacrylate.

6. The composition of claim 5 which further comprises $TiO_2$, a defoamer, a surfactant, a dispersant, and a rheology modifier.

7. The composition of claim 1 wherein the first and second polymer particles each comprise structural units of methyl methacrylate or styrene, and at least one monomer selected from the group consisting of ethyl acrylate, butyl acrylate, ureido methacrylate, 2-propylheptyl acrylate, and 2-ethylhexyl acrylate; wherein the weight:weight ratio of first polymer particles to the second polymer particles is in the range of from 30:70 to 90:10.

8. The composition of claim 7 wherein the second polymer particles are two-phase polymer particles having a first phase with a $T_g$ of less than 10° C. and a second phase with a $T_g$ of greater than 40° C., wherein the phosphorus acid monomer is phosphoethyl methacrylate.

9. The composition of claim 8 wherein the first polymer particles comprise from 0.3 to 10 weight percent, based on the weight of the first polymer particles, of structural units of a multiethylenically unsaturated monomer.

10. The composition of claim 9 wherein the first polymer particles comprise less than 0.05 structural units of diacetone acrylamide, based on the weight of the first polymer particles;
   and wherein the second polymer particles comprise less than 0.01 weight percent structural units of phosphoethyl methacrylate, based on the weight of the second polymer particles.

11. The composition of claim 10 wherein the $T_g$ of the first polymer particles is in the range of from −5° C. to 25° C.

* * * * *